United States Patent [19]

Dutton, Jr. et al.

[11] Patent Number: 5,344,717
[45] Date of Patent: Sep. 6, 1994

[54] METHOD OF BRAZING AND APPARATUS

[75] Inventors: Dwight C. Dutton, Jr., Wheat Ridge; Antonio X. Luna, Longmont; Charles P. Stack, Louisville, all of Colo.

[73] Assignee: Micro Motion, Incorporated, Boulder, Colo.

[21] Appl. No.: 9,316

[22] Filed: Jan. 25, 1993

[51] Int. Cl.$^5$ .......... G01F 1/84; F16L 55/00; B23K 1/20; B23K 101/04
[52] U.S. Cl. .......... 428/598; 428/599; 428/600; 228/174; 228/189; 73/861.38
[58] Field of Search .......... 428/586, 600, 599, 598; 228/170, 174, 221, 248, 189; 285/287; 73/861.38

[56] References Cited

U.S. PATENT DOCUMENTS

| 6,488 | 6/1849 | Van Duzer | 285/287 |
|---|---|---|---|
| 150,109 | 4/1874 | Van Duzer | 228/189 |
| 1,744,932 | 1/1930 | Swank | 285/287 |
| 2,216,033 | 9/1940 | Hopkins | 228/189 |
| 3,065,533 | 11/1962 | Dungan et al. | 29/472.7 |
| 3,078,551 | 2/1963 | Patriarca et al. | 285/287 |
| 3,846,903 | 11/1974 | Rupert | 29/487 |
| 4,043,500 | 8/1977 | Padden et al. | 228/189 |
| 4,090,657 | 5/1978 | Anderson | 228/119 |
| 4,272,006 | 6/1981 | Kao | 285/287 |
| 4,317,269 | 3/1982 | Martin et al. | 228/170 |
| 4,519,537 | 5/1985 | Heinrich et al. | 228/221 |
| 4,676,427 | 6/1987 | Constance et al. | 228/189 |
| 4,726,508 | 2/1988 | Carpenter | 228/263.13 |
| 4,768,385 | 9/1988 | Cage | 73/861.38 |
| 5,071,174 | 12/1991 | Griffin et al. | 285/287 |

FOREIGN PATENT DOCUMENTS

| 55-45572 | 3/1980 | Japan | 228/189 |
|---|---|---|---|
| 51628 | 10/1932 | Norway | 228/189 |
| 1567344 | 5/1990 | U.S.S.R. | 228/174 |

OTHER PUBLICATIONS

Brazing Manual, American Welding Society, Inc., pp. 86, 87, approved Feb. 28, 1975 by AWS Bd. of Dirs.

Primary Examiner—John Zimmerman
Attorney, Agent, or Firm—Duft, Graziano & Forest

[57] ABSTRACT

A method of brazing and apparatus therefor wherein two elements are bonded together using pre-formed fillet material. In accordance with a first alternative embodiment, the pre-formed fillet material comprises a depression formed on a first surface of one of the elements by a punching operation. The preformed fillet material also comprises a protrusion formed on a second surface opposite the depression formed by the punching operation. The invention also comprises a method of reducing bending stress in a Coriolis flow tube by bonding the flow tube and a brace bar with preformed fillet material.

21 Claims, 3 Drawing Sheets

METHOD OF BRAZING AND APPARATUS

FIELD OF THE INVENTION

This invention relates to apparatus for and a method of bonding two elements with a brazed joint that includes a pre-formed fillet for reducing stress in the brazed joint. This invention further relates to a method of bonding a brace bar and flow tube of a Coriolis effect flow meter so that bending stress is reduced in the flow tube and increased in the brace bar.

STATEMENT OF THE PROBLEM

It is known to bond two structural elements together by a brazing process that includes the steps of: applying material to the surfaces of the two elements that are to be joined, and subjecting the elements to a high temperature brazing operation that melts the braze material to bond the two elements. Fillets are often used in the brazing process. However, elements may be joined without relying on a fillet in applications in which the elements are not subject to movement or vibration. The fillet is not then needed to distribute the applied stress. In this case, the to create braze material is heated and flowed over the surfaces to be joined a sufficient bond to hold the two elements together. In applications in which the elements may be subject to vibration, it is desirable to form a bond that includes a fillet positioned at an intersection of the surfaces that are to be joined. The fillet decreases the stress concentration at the intersection of the joined surfaces.

Care must be exercised in forming a fillet comprised of braze material if it is to provide an improved bond. The braze fillet must have an adequate cross-sectional area and an inwardly concave surface that joins the surface of each element in a relatively smooth, non-abrupt manner. The braze fillet must also be free of porosity and cracks in its surface.

Braze joints are formed by an operator applying braze material to the elements to be joined and then subjecting the elements to a vacuum brazing operation. This causes the braze material to melt and form a bond between the two elements. Although this process is usually satisfactory, the resultant fillets are not always ideal and may sometimes be unsuitable for use in applications in which the joined elements are subject to vibration. Vibration can cause cracks to form in the fillet. These cracks can extend into and cause a failure of the joined elements.

Cracks can form in a braze fillet for various reasons. Small microscopic holes may be present in the material comprising the fillet. The fillet may contain small surface cracks that are not visible to the human eye. These holes and cracks can enlarge and cause structural failure. Another defect that may cause cracking is that the fillet may be of an insufficient cross-sectional area or may have a surface contour that does not provide a smooth continuous transition where the edge of the fillet meets the surface of the joined element.

Any of these defects may be latent in the braze fillet after the brazing operation. A latent defect can grow and propagate in applications where the bonded elements are subject to vibration such as, for example, when one of the elements is a flow tube of a Coriolis mass flow meter. In such cases, an initial microscopic-sized defect, such as a pore or a surface crack, can grow and propagate. In so doing, the defect changes from a micro-crack to a macro-crack. This macro-crack can continue its propagation and extend into the material comprising one of the joined elements and ultimately causes a breakdown of the element and a failure of the structure of which the element is a part.

The practice of relying on a fillet composed of braze material is unpredictable and uncontrollable with regard to the defects that may be in the braze fillet upon completion of the brazing operation. The operator does not have complete control of whether the braze fillet will be free from pores or free from surface cracks. The operator also does not have complete control over the exact size, cross-sectional area, or contour of the formed fillet. The operator's control is limited to applying the braze material in a manner that hopefully produces a fillet that is defect-free and has the required cross-sectional area and contour. This goal is usually achieved. However, this goal is sometimes not achieved and the formed fillet may be unsuitable for critical applications. In some cases, the fillet may appear to be satisfactory, but may contain microscopic defects that ultimately cause a destruction in use of the device of which the bonded elements are a part. Even though satisfactory results are usually achieved, the results are not always satisfactory and the bonded elements can be rendered unsuitable by a defective fillet.

It can therefore be seen that it is currently a problem to bond elements which rely on a fillet comprised of braze material and formed during a vacuum brazing operation.

STATEMENT OF THE SOLUTION

The present invention overcomes the above-discussed problems and achieves a technical advance in the art of brazing by using fillets that are formed in advance of the brazing operation rather than being formed from braze material.

In accordance with a first possible exemplary embodiment, an improved method of brazing and apparatus therefore is provided by pre-forming a piece of metal into the contours of an ideal fillet and then brazing the pre-formed fillet to the surfaces of the elements to be joined. These elements may comprise a Coriolis flow tube and a brace bar having a hole for receiving the flow tube. The brace bar and the Coriolis flow tube are brazed using the preformed fillet to reduce the stress concentration at the intersection of the tube and the brace bar. This is done by decreasing the bending stress in the flow tube and increasing the bending stress in the brace bar.

In accordance with the invention, a hole is formed in the brace bar for receiving the flow tube. During the forming of the hole, the brace bar is subject to a machining operation in which the area adjacent the hole on one surface of the brace bar is machined to create a groove whose contour approximates an idealized fillet. The flow tube is then inserted into the hole and a split-ring washer having the contour of an idealized fillet is slipped over the bottom of the tube and up against the other surface of the brace bar. A small amount of braze material is applied at the split in the washer and then subjected to a vacuum brazing operation. Capillary action draws the molten braze material through the joint to bond the elements together. The bonded joint includes an idealized fillet on both surfaces of the brace bar around the flow tube. The fillet on the one surface of the brace bar comprises the groove formed by the machining operation. The split-ring washer fillet encircles the tube and is affixed to the other surface of the brace bar. The pre-formed fillets on the surfaces of the brace bar adjacent the flow tube provide a minimum stress concentration to the bonded joint when the Coriolis flow tube is vibrated during the use of the Coriolis effect flow meter of which it is a part.

The use of pre-formed fillets including the split-ring washer and the machined groove in the brace bar permits the use of known material which may be inspected in advance for defects such as porosity and surface cracks. This provides an improved bonded fillet joint over that which can be achieved by use of the braze material which is subject to random defects that can shorten the life of the bonded joint and result in the ultimate failure of the structural elements that are bonded together.

In accordance with a second possible exemplary embodiment of the invention, a pair of elements, such as a Coriolis flow tube and a brace bar, are bonded together by the use of pre-formed fillets formed in one of the elements to be joined. A punching operation form a depression in one surface of the brace bar and simultaneously a protrusion forms in the other surface of the brace bar immediately opposite the portion that is subject to the punching operation. The brace bar material adjacent the depression on the one surface of the brace bar has the contour and cross-sectional area of an idealized fillet. The protruded portion on the opposite surface of the brace bar also has the cross-sectional area and contour of an idealized fillet. A Coriolis flow tube is inserted into the brace bar hole and a bonded joint is formed when braze material is applied to the brace bar and the tube which are then subject to a high vacuum brazing operation. The resulting bonded joint contains pre-formed fillets comprising the brace bar material on both surfaces of the brace bar immediately adjacent the flow tube. In this design, the braze material performs the bonding function while the pre-formed fillet serves the function of distributing the load.

Further, in accordance with the invention, the inner surface of the brace bar hole is formed with extrusions which ensure that the exterior surface of the flow tube and the interior surface of the hole are separated by an amount sufficient to allow the braze paste to flow therein during a brazing operation.

The principles of the present invention can also be applied to the brazing together of two flat elements or two elements having irregular surfaces. The elements may be joined together at their intersecting surfaces by separate fillets pre-formed or by fillets formed when one side of the one element is subject to a punching operation in which a depression is formed and a corresponding protrusion is formed on the other side of the element. A portion of the material adjacent the depression comprises the fillet for one surface of the element while the protrusion material comprises the fillet for this other surface of the element.

The use of pre-formed fillets in both of the above embodiments enables the use of known fillet material which may be inspected in advance for defects such as porosity and surface cracks. This provides an improved braze joint over that which can be achieved by the use of a fillet composed of braze material which is subject to random defects that can shorten the life of the bonded joint and result in the ultimate failure of the structural elements that are bonded together.

It can therefore be seen in view of the above that the present invention overcomes the above-discussed disadvantages and problems of the prior art by bonding elements together with the use of pre-formed fillets which may be fabricated in advance of the brazing operation and inspected so as to be free from defects which could result in a premature failure of the bonded joint formed by the brazing operation.

BRIEF DESCRIPTION OF THE DRAWING

The above and other advantages and features of the invention may be better understood from a reading of the following description thereof wherein.

DETAILED DESCRIPTION OF THE PREFERRED EMBODIMENT

Figure 2:
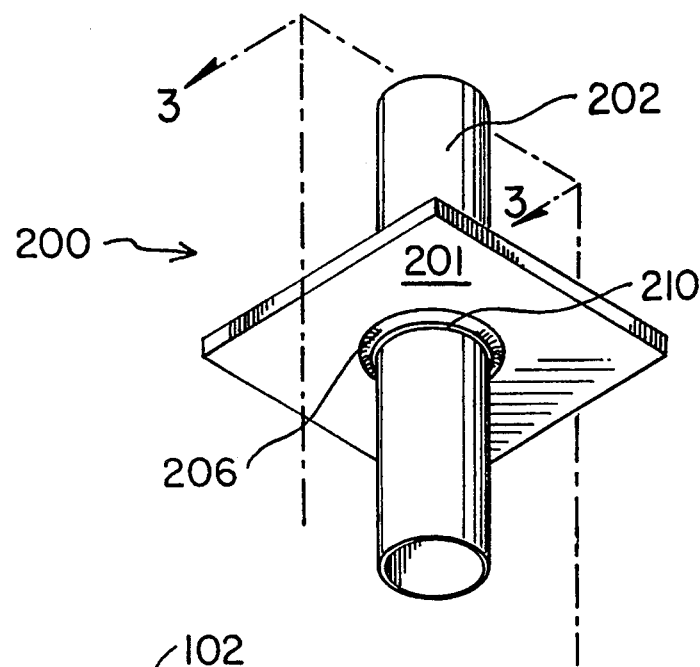
FIG. 2 is a perspective view of two elements bonded together in accordance with the present invention.
Figure 1:
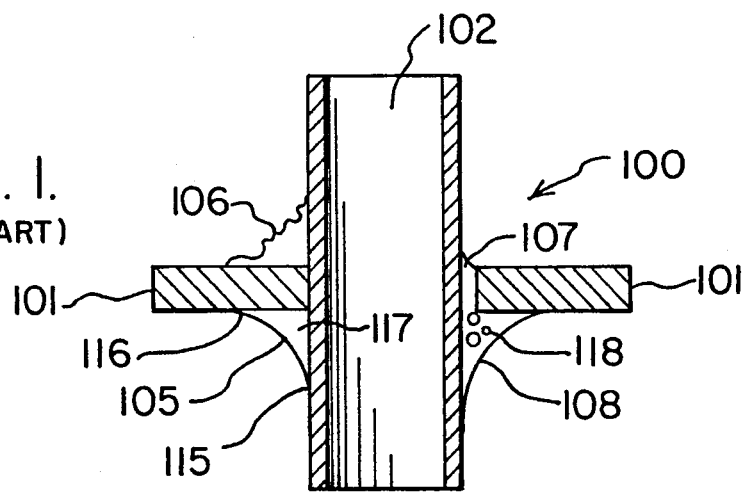
FIG. 1 illustrates two elements bonded together with defective fillets.

FIG. 1 illustrates fillets produced by prior art brazing operations relying on braze material to form a fillet. FIG. 1 discloses an element 101 which is bonded to tube 102 by four separate fillets 105, 106, 107, and 108.

Fillet 105 is defect-free since it has an adequate cross-sectional area 117 which is solid throughout and an outer surface of a sufficiently large radius so that its ends 115 and 116 present a smooth transition between the lower surface of element 101 and the left surface of tube 102. Fillet 108 joins the lower surface of element 101 and the right surface of tube 102. Fillet 108 has an adequate radius and cross-sectional area. However, fillet 108 is defective since it contains voids (pores) such as 118. Fillet 106 bonds the upper surface of element 101 with the left surface of tube 102. Fillet 106 is undesirable since it contains uneven contours and microscopic cracks. Fillet 107 bonding the upper surface of element 101 and the right surface of tube 102 is defective since it has an inadequate cross-sectional area and since the transitions between it and the surface of elements 101 and 102 are abrupt. Fillet 105 is adequate for use in bonding since it is defect-free. The surface defects in fillet 106 and the porosity defects in fillet 108 can result in cracking within these fillets over a period of time when element 101 and tube 102 are subject to vibration. These cracks can propagate into tube 101 and cause it to fail. Fillet 107 has an inadequate cross-sectional area and an overly abrupt transition with the surface of elements 101 and 102. The bond provided by this fillet can result in early cracking of one or both element(s) 101 or 102.

The fillets of FIG. 1 are formed by a vacuum brazing process wherein braze material is first applied to the intersection of the surfaces of elements 101 and 102 to form fillets 105, 106, 107, and 108. Although the operator may apply the braze paste with skill and expertise in the hopes of forming an ideal fillet, the resultant fillets may vary in quality due to the materials used in the vacuum bonding operation. Fillets of varying qualities, types, and characteristics may result. Sometimes, an ideal fillet such as 105 is produced. At other times, fillets having the defects of fillets 106, 107, or 108, are produced even though the operator applied the braze material with skill and precision.

Figure 3:
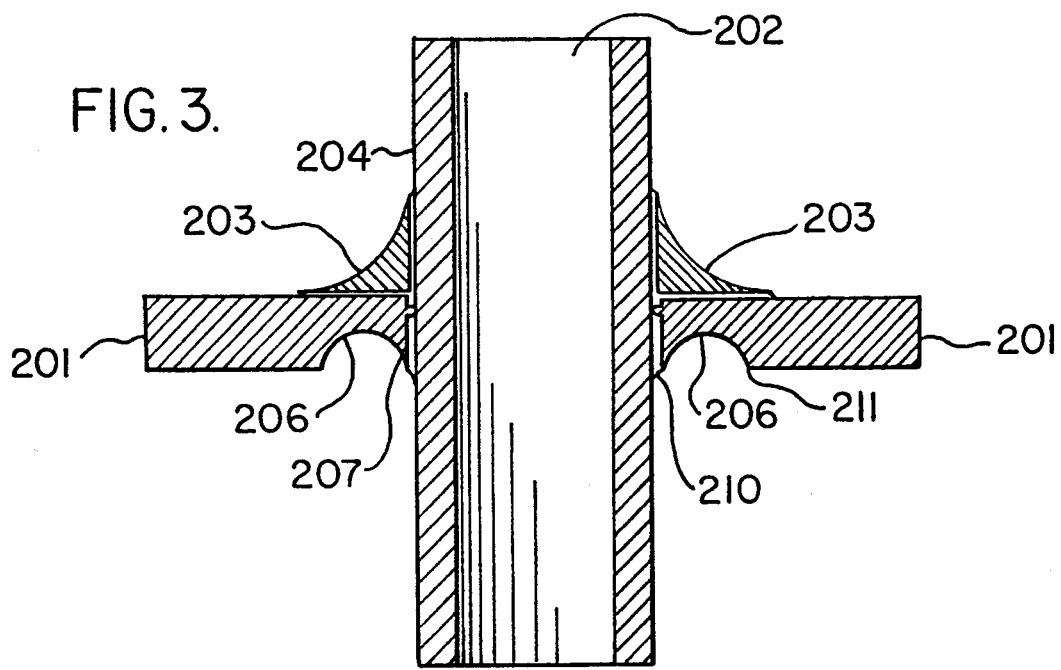
FIG. 3 is a cross-sectional view taken along lines 3—3 of the embodiment of FIG. 2.
Figure 4:
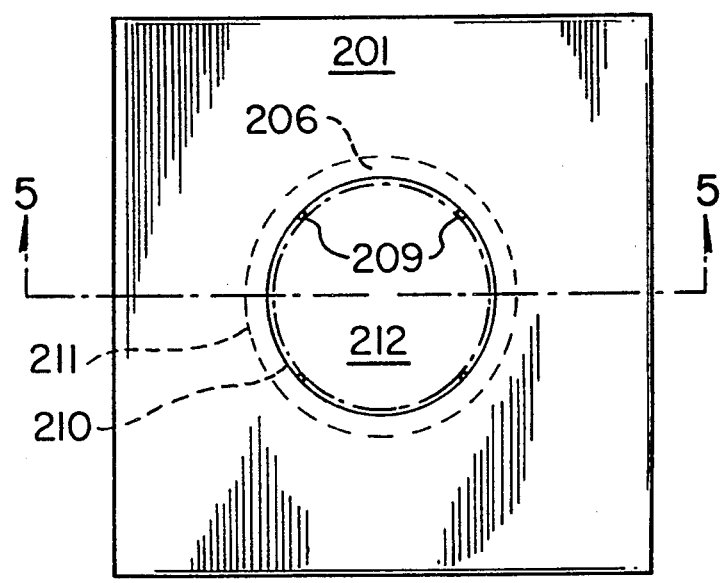
FIG. 4 is a plan view of one surface of the brace bar 201 of FIG. 2.
Figure 5:
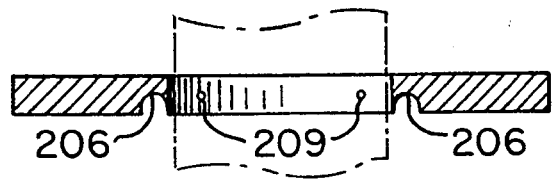
FIG. 5 is a cross-sectional view of brace bar 201 taken along lines 5—5 of FIG. 4.
Figure 6:
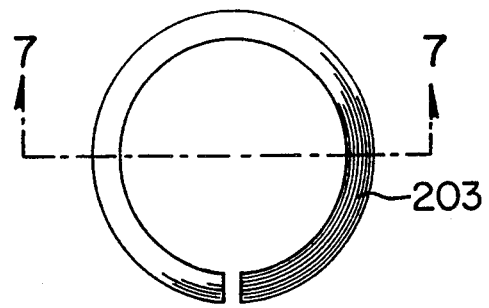
FIG. 6 discloses further details of split-ring washer 203 of FIGS. 2 and 3.
Figure 7:
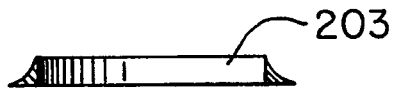
FIG. 7 is a cross-sectional view of washer 203 taken along lines 7—7 of FIG. 6.

FIGS. 2 through 7 illustrate how elements 201 and 202 may be bonded together using pre-formed circular fillets in accordance with the present invention. Element 201 is a flat brace bar having a hole 212 (FIG. 4) for receiving tube 202. A circular fillet on one surface of brace bar 201 comprises groove 206 (FIGS. 3 and 4). The circular fillet on the other surface of the brace bar comprises split ring washer 203. Split-ring washer 203 is slipped over an end of tube 202 and against the surface of brace bar 201 so as to supply the fillet material that bonds the inner surface of hole 212 of brace bar 201 with the outer surface 204 of tube 202. The lower surface of brace bar 201 is machined so as to have a depression or groove 206 as shown in FIGS. 3 and 4. This groove has an outer circumference 211 and an inner circumference 210 (FIG. 3). The material between the inner circumference 210 and the middle of groove 206 comprises a fillet 207 as shown in FIG. 3. This fillet has an adequate cross-sectional area that provides a smooth transition with the outer surface 204 of tube 202. Split-ring washer 203 is shown in further detail in FIGS. 6 and 7. Split-ring washer 203 is slipped over an end of tube 202 and lowered as shown in FIG. 3 until the lower surface of the split-ring washer 203 contacts the upper surface of brace bar 201.

On FIG. 4, the inner surface 210 of hole 212 within brace bar 201 includes outward protrusions 209. When tube 202 is inserted in hole 212 of brace bar for 201, the outer surface 204 of tube 202 is spaced apart by a predetermined minimum distance from inner surface or circumference 210 of hole 212. This minimum distance permits braze material to flow between the surface 210 of brace bar 201 and the outer surface 204 of tube 202 during a vacuum brazing operation.

Prior to the brazing operation, the split region of split-ring washer 203 has and tube 202 have braze material applied thereto. The entire assembly is then placed in a high-temperature oven exceeding 800° F. for a vacuum brazing operation. During this operation, the brazing material melts, capillary action draws the braze material into the joint, the braze material solidifies, and bonds the surface 210 of hole 212 to outer surface 204 of tube 202. The flat surfaces of split-ring washer 203 are also bonded to surface 204 of tube 202 as well as to the upper surface of brace bar 201.

As a result of the vacuum brazing operation, the inner surface 210 (FIG. 4) of brace bar 201 is bonded to the exterior surface 204 of tube 202 by fillet material 207 and forms a good bond between these elements. Similarly, the upper surface 210 of brace bar 201 is bonded to the exterior surface 204 of tube 202 by a fillet comprising the split-ring washer 203. Fillets 207 and 203 are not subject to the defects of fillets 106, 107, and 108. They may be inspected in advance for defects such as porosity, surface defects, inadequate cross-sectional area, and inadequate transition end points. The bond provided by fillets 203 and 207 is free from defects and provides a good bond even though tube 202 may subsequently be subject to flexing and vibration. This bond also reduces bending stress in tube 202 and increases bending stress on brace bar 201. This is advantageous when tube 202 comprises a flow tube of a Coriolis effect flow meter.

Figure 8:
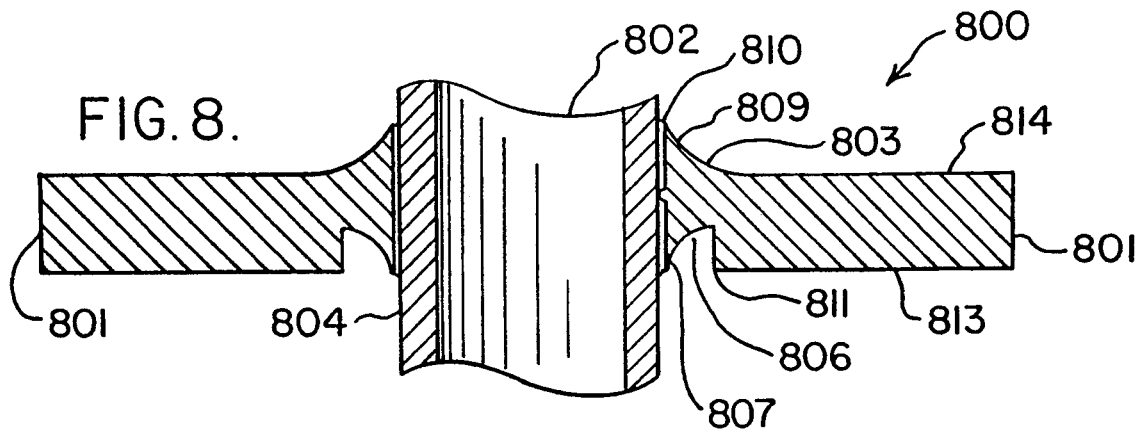
FIG. 8 discloses a brace bar and a tube bonded together using pre-formed fillets comprising the brace bar itself.

FIG. 8 discloses an alternative embodiment of the invention wherein a tube 802 is bonded to a brace bar 801. Tube 802 of FIG. 8 is generally similar to tube 202 of FIGS. 2 and 3. Brace bar 801 includes a hole (similar to hole 212 of FIG. 4) for receiving tube 802. During its fabrication, brace bar 801 is subject to a punching operation on its bottom surface adjacent the vicinity of its hole. This punching operation forms a depression 806 in the lower surface 813 of brace bar 801. This punching operation also deforms the upper surface 814 of the brace bar in the vicinity of the hole so that the protruding material 809 of this portion of the brace bar is forced upwardly in the manner shown in FIG. 8. After the punching operation, material 807 of groove 806 has the overall configuration of an ideal fillet while the protruding material 809 also has the characteristics and contour of an idealized fillet. Braze paste is then applied to the exterior of the joint interface of tube 802 and brace bar 801 and subjected to a high temperature vacuum brazing operation in which elements 802 and 801 are permanently bonded. The surface 804 of tube 802 is bonded to the inner surface of the hole in brace bar 801 by fillet material 807 while the surface 802 of tube 804 is also bonded to the top brace bar 801 by means of fillet material 809. These pre-formed fillets provide an ideal bond that will provide maximum protection against the failure during the life of these elements as they may be subject to vibration.

The present invention is not limited in its application to the bonding of a flat element having a hole to a circular element such as tube 202. If desired, the principles and teachings of the present invention may be equally applicable to the bonding of a first flat element to a second element where the intersection of the two elements may be either a straight line or an irregular surface.

Figure 9:
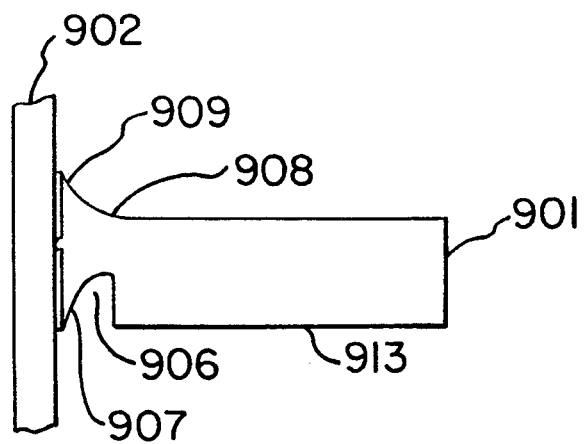
FIGS. 9 discloses how flat elements can be joined to each other using pre-formed fillets.

FIG. 9 is similar to FIG. 8 except that it shows two elements 902 and 901 bonded together in a manner generally similar to that previously described for FIG. 8. Element 901 is subject to a punch press operation in which a groove 906 is formed in the lower surface 913. This causes a an upward material deformation that produces fillet 909. The left portion of groove 906 comprises material 907 which has the configuration of an idealized fillet. These elements are covered with braze paste so as to bond them together with material that includes fillet 907 on the bottom surface of element 901 and fillet 909 on the upper surface of element 901.

It is to be expressly understood that the claimed invention is not to be limited to the description of the preferred embodiment but encompasses other modifications and alterations within the scope and spirit of the inventive concept. Thus, the term bonding as used herein includes all processes where metal is heated and caused to flow to form a solid joint between two or more metals. Such processes can include soldering, welding, and brazing.

We claim:

1. A method of bonding a first element to a second element, said method comprising the steps of:
   pre-forming fillets wherein a depression is formed in one surface of said first element to define material shaped as a fillet and wherein a protrusion shaped as a fillet is formed opposite said depression defined material on a second surface of said first element;

abutting surfaces of said fillets and a surface of said first element against a surface of said second element; and bonding said first and second elements together wherein said surfaces of said fillets and said surface of said first element are bonded to said surface of said second element.

2. The method of claim 1 wherein said step of bonding comprises a vacuum brazing operation and wherein said method further includes the steps of:

applying braze paste to said surfaces of said fillets and to said surface of said first element as well as to said surface of said second element.

3. The method of claim 2 wherein said surfaces of said fillets are smooth for engagement with said surface of said second element and wherein said fillets each further comprise:

a smooth concave surface having a radius that enables ends of said smooth concave surface to provide a smooth transition with said surface of said second element.

4. The method of claim 1 wherein said depression and said protrusion are formed by a punching operation.

5. A method of bonding a tubular element to a flat element having a hole therein for receiving said tubular element;

said method comprising the steps of:

forming a circular depression shaped as a fillet around said hole in a first surface of said flat element;

forming protruding material shaped as a fillet around said hole in a second surface of said flat element opposite said formed fillet in said first surface of said flat element;

inserting said tubular element into said hole of said flat element so that an inner surface of said fillets and an inner surface of said hole of said flat element each comprises a mating surface that is abutted to a mating exterior surface on said tubular element; and subjecting said fillets of said flat element and said tubular element to a bonding operation wherein said mating surfaces of said fiat element and said fillets are bonded to a said mating exterior surface of said tubular element;

said fillets being effective for providing bending stress reduction in said tubular element immediately adjacent the portion of said tubular element that is bonded with said fillets.

6. The method of claim 5 wherein said fillets comprise:

smooth surfaces for engaging said mating exterior surface of said tubular element; and a concave smooth surface having a radius that enables ends of said concave smooth surface to provide a smooth transition with a smooth surface of said flat element and a smooth surface of said tubular element.

7. The method of claim 6 wherein said step of bonding comprises a vacuum brazing operation and wherein said method further includes the steps of:

applying braze paste to said mating surfaces of said fillets and said flat element as well as to said mating surface of said tubular element; and subjecting said flat element and tubular element and said fillets to said vacuum brazing operation.

8. The method of claim 5 wherein said depression and said protruding material are formed by a punching operation.

9. Apparatus comprising a first element and a second element said apparatus produced by the steps of:

forming fillets in said first element wherein a depression defines material shaped as a fillet in one surface of said first element and a protrusion defines material shaped as a fillet in a second surface of said first element opposite said depression defined fillet material;

abutting a mating surface of said fillets and a mating surface of said first element against a mating surface of said second element; and bonding said mating surfaces of said fillets and said mating surface of said first element to said mating surface of said second element.

10. The apparatus of claim 9 wherein said bonding is formed by a vacuum brazing operation in which braze paste is applied to said mating surfaces of said fillets and to said mating surface of said first element as well as to said mating surface of said second element.

11. The apparatus of claim 10 wherein said mating surfaces of said fillet are smooth for engagement with said mating surface of said second element and wherein each said fillet further comprises:

a smooth concave surface having a radius that enables ends of said smooth concave surface to provide a smooth transition with said mating surface of said second element.

12. The apparatus of claim 11 wherein said depression and said protruding material are formed by a single punching operation.

13. The apparatus of claim 9 wherein said depression and said protrusion are formed by a single punching operation.

14. Apparatus including a flat element bonded to a tubular element, said apparatus produced by the steps of:

forming a first circular fillet defined by a depression around a hole in a first surface of said flat element;

forming a second circular fillet comprising protruding material formed as a fillet around said hole in a second surface of said flat element opposite said depression defined fillet in said first surface;

positioning said tubular element into said hole of said flat element as well as into said first and second circular fillets;

abutting a mating surface of each of said fillets and a mating surface on an inner surface of said hole of said flat element to a mating exterior surface on said tubular element; and bonding said fillets and said fiat element and said tubular element wherein said mating surfaces of said flat element and said fillet are bonded to said mating exterior surface of said tubular element.

15. The apparatus of claim 14 wherein said each of said fillets comprises:

a smooth flat mating surface for engaging said mating exterior surface of said tubular element; and a concave smooth surface having a radius that enables ends of said concave smooth surface to provide a smooth transition with a smooth surface of said flat element and a smooth surface of said tubular element.

16. The apparatus of claim 15 wherein said bond is formed by a vacuum brazing operation in which:

braze paste is applied to said mating surfaces;

said flat element and tubular element and said fillet being subjected to said vacuum brazing operation.

17. The apparatus of claim 14 wherein protrusions are formed on said mating surface of said flat member to maintain a minimum separation between said mating surfaces of said flat member and said tubular member.

18. A method of bonding a brace bar of a Coriolis effect flow meter to a flow tube of said Coriolis effect flow meter for increasing the operational bending stress in said brace bar and decreasing the operational bending stress in said flow tube, said brace bar having a hole therein for receiving said flow tube, said method comprising the steps of:

preforming a fillet having a hole therein, abutting said preformed fillet against a first surface of said brace bar so that said hole of said brace bar is in axial alignment with said hole in said preformed fillet, forming a depressed circular fillet around said hole in a second surface of said brace bar;

inserting said flow tube into said hole of said brace bar and said hole of said fillet so that an inner surface of each of said fillets and an inner surface of said hole of said brace bar each comprises a mating surface that is abutted to a mating exterior surface on said flow tube; and subjecting said fillet and said brace bar and said flow tube to a bonding operation that reduces the operational bending stress in said flow tube and increases the operational bending stress in said brace bar wherein said mating surfaces of said brace bar and said fillet are bonded to a said mating exterior surface of said flow tube.

19. The method of claim 18 wherein vibrations are present in the portion of said flow tube on the side of said brace bar that includes first surface of said brace bar.

20. A method of bonding a brace bar of a Coriolis effect flow meter to a flow tube of said Coriolis effect flow meter for decreasing the operational bending stress in said flow tube and increasing the operational bending stress in said brace bar, said brace bar having a hole therein for receiving said flow tube, said method comprising the steps of:

forming a depressed circular fillet around said hole in a first surface of said brace bar;

forming protruding material shaped as a fillet around said hole opposite said depressed circular fillet in a second surface of said brace bar;

inserting said flow tube into said hole of said brace bar so that an inner surface of each of said fillets and an inner surface of said hole of said brace bar each comprises a mating surface that is abutted to a mating surface on said flow tube; and subjecting said fillets and said brace bar and said flow tube to a bonding operation wherein said mating surfaces of said brace bar and said fillets are bonded to said mating surface of said flow tube.

21. The method of claim 20 wherein vibrations are present in the portion of said flow tube on the side of said brace bar that includes said second surface of said brace bar.

* * * * *